(12) United States Patent
Chang et al.

(10) Patent No.: US 11,594,134 B2
(45) Date of Patent: Feb. 28, 2023

(54) PARKING SPACE DETECTION METHOD AND APPARATUS, ELECTRONIC DEVICE, VEHICLE AND STORAGE MEDIUM

(71) Applicant: APOLLO INTELLIGENT DRIVING TECHNOLOGY (BEIJING) CO, LTD., Beijing (CN)

(72) Inventors: Songtao Chang, Beijing (CN); Cong Chen, Beijing (CN); Wenzhi Bai, Shenzhen (CN); Guibin Tian, Shenzhen (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 280 days.

(21) Appl. No.: 17/060,323

(22) Filed: Oct. 1, 2020

(65) Prior Publication Data

US 2021/0190947 A1 Jun. 24, 2021

(30) Foreign Application Priority Data

Jan. 21, 2020 (CN) .......................... 202010071956.6

(51) Int. Cl.
*G01S 15/931* (2020.01)
*G01S 15/89* (2006.01)
(Continued)

(52) U.S. Cl.
CPC .............. *G08G 1/143* (2013.01); *G01S 15/89* (2013.01); *G01S 15/931* (2013.01);
(Continued)

(58) Field of Classification Search
None
See application file for complete search history.

(56) References Cited

U.S. PATENT DOCUMENTS

| 2013/0021171 A1 | 1/2013 | Hsu et al. |
| 2015/0130640 A1 | 5/2015 | Ryu et al. |
| 2015/0348414 A1 | 12/2015 | Jung |

(Continued)

FOREIGN PATENT DOCUMENTS

| CN | 104637342 A | 5/2015 |
| CN | 106371104 A | 2/2017 |

(Continued)

OTHER PUBLICATIONS

Notice of Allowance in CN Patent Application No. 202010071956.6 dated Jan. 11, 2022.

(Continued)

*Primary Examiner* — Thomas S McCormack
(74) *Attorney, Agent, or Firm* — Dilworth IP, LLC

(57) ABSTRACT

Embodiments of the present disclosure disclose a parking space detection method and apparatus, an electronic equipment, a vehicle, and a storage medium, which relate to the field of automatic driving technologies and in particular, to the field of autonomous parking, including: collecting ultrasonic information during a moving process of a vehicle, generating a target grid map, performing feature recognition on the target grid map to obtain a line segment, and generating a parking space according to the line segment and the target grid map. By implementing the present disclosure, a disadvantage of a limited range of application in the prior art caused by that the detection of a parking space requires a travelling direction of a vehicle to be parallel with a side of an obstacle and requires the vehicle to be close to the obstacle is avoided, thereby achieving a relatively wide use and improving detection accuracy.

18 Claims, 11 Drawing Sheets

(51) Int. Cl.
   *G08G 1/14*       (2006.01)
   *G06V 10/44*      (2022.01)
   *G06V 10/143*     (2022.01)
   *G06V 20/58*      (2022.01)

(52) U.S. Cl.
   CPC .......... *G06V 10/143* (2022.01); *G06V 10/457* (2022.01); *G06V 20/58* (2022.01); *G06V 20/586* (2022.01); *G08G 1/141* (2013.01); *G01S 2015/933* (2013.01)

(56) References Cited

U.S. PATENT DOCUMENTS

| | | | |
|---|---|---|---|
| 2018/0095474 A1 | 4/2018 | Batur et al. | |
| 2018/0354504 A1 | 12/2018 | Kojo et al. | |
| 2020/0104613 A1 | 4/2020 | Hirai | |
| 2021/0291814 A1* | 9/2021 | Shirozono | B60W 50/14 |

FOREIGN PATENT DOCUMENTS

| | | | |
|---|---|---|---|
| CN | 109001757 A | 12/2018 | |
| CN | 109031346 A | 12/2018 | |
| CN | 109435942 A | 3/2019 | |
| CN | 109598972 A | 4/2019 | |
| CN | 109843676 A | 6/2019 | |
| CN | 110687539 A | 1/2020 | |
| DE | 102017216442 A1 | 3/2019 | |
| JP | 2011227582 A | 11/2011 | |
| JP | 2017532234 | 11/2017 | |
| JP | 2020057081 A | 4/2020 | |
| KR | 20210038401 A | 4/2021 | |
| WO | 2017104163 A1 | 6/2017 | |
| WO | 2020007235 A1 | 1/2020 | |

OTHER PUBLICATIONS

First Office Action in JP Patent Application No. 2020173434 dated Oct. 5, 2021.
Second Office Action in CN Patent Application No. 202010071956.6 dated Aug. 23, 2021.
First Office Action in CN Patent Application No. 202010071956.6 dated Jan. 15, 2021.
Kammel, Soren et al., Lidar-based lane marker detection and mapping, IEEE Vehicles Symposium, 2008, pp. 1137-1142.
Pohl, J. et al., A semi-automated parallel parking system for passenger cars, Proc IMechE vol. 220 Park D: J. Automobile Engineering, 2006, pp. 53-65.
European Search Report in EP Patent Application No. 20200412.3 dated Aug. 2, 2021.
First Office Action in KR Patent Application No. 10-2020-01473440 dated Jul. 28, 2021.
Langer, D. et al., Sonar based Outdoor Vehicle Navigation and Collision Avoidance, Proceedings of the IEEE/RSJ International Confernce on Intelligent Robots and Systems, Jul. 1992 pp. 1445-1450.
Chang, G. et al., Zooming: A Zoom-Based Approach for Parking Space Availability in VANET, IEEE VEhicular Technology Conference, May 2010, pp. 1-5.
Suhr, J. et al., Automatic Parking Space Detection and Tracking for Underground and Indoor Environments, IEEE Transactions on Industrial Electronics, Sep. 2016, pp. 5687-5698.
European Search Report in EP Patent Application No. 20200412.3 dated Mar. 25, 2021.
Second Office Action in JP Patent Application No. 2020-173434 dated Nov. 10, 2022.

* cited by examiner

PARKING SPACE DETECTION METHOD AND APPARATUS, ELECTRONIC DEVICE, VEHICLE AND STORAGE MEDIUM

CROSS-REFERENCE TO RELATED APPLICATIONS

This application claims priority to Chinese Patent Application No. 202010071956.6, filed on Jan. 21, 2020, which is hereby incorporated by reference in its entirety.

TECHNICAL FIELD

Embodiments of the present disclosure relate to the field of automatic driving technologies and in particular, to the field of autonomous parking, and specifically, to a parking space detection method and apparatus, an electronic device, a vehicle and a storage medium.

BACKGROUND

A parking space includes a spatial parking space, which refers to a parking space that has no parking space lines, and is determined by an obstacle (including a vehicle, a wall, a pillar, a pole, etc.) and a position of the obstacle.

In the prior art, a parking space (especially a space parking space) is mainly detected through a jump edge of ultrasonic data. Specifically, a jump edge of ultrasonic detection data is collected on a side of a vehicle, and when an interval between the jump edges is greater than a certain threshold, a parking space will be determined.

However, in a process of implementing the present disclosure, the inventor finds at least the following problems: the parking space detection based on the jump edges of ultrasonic data requires a travelling direction of a vehicle to be parallel with a side of the obstacle and requires the vehicle to be close to the obstacle, which leads to a limited range of application and low detection accuracy.

SUMMARY

According to an aspect of embodiments of the present disclosure, the embodiments of the present disclosure provide a parking space detection method, and the method includes:

collecting ultrasonic information during a moving process of a vehicle;

generating a target grid map corresponding to the ultrasonic information, the target grid map including an obstacle point;

performing feature recognition on the target grid map to obtain a line segment; and generating a parking space according to the line segment and the target grid map, so as to display the parking space.

A target grid map corresponding to ultrasonic information is generated and a parking space is generated based on the target grid map and a line segment obtained by performing feature recognition on the target grid map, which on the one hand avoids a disadvantage of a limited range of application in the prior art caused by that the detection of a parking space (for example, a spatial parking space) requires a travelling direction of a vehicle to be parallel with a side of an obstacle and requires the vehicle to be close to the obstacle, thereby achieving a relatively wide range of application, and on the other hand, avoids a disadvantage of a large error range in the prior art caused by a comparison between an interval of jump edges and a threshold, thereby achieving a technical effect of improving detection accuracy.

In some embodiments, the generating a parking space according to the line segment and the target grid map includes:

selecting a characteristic line segment corresponding to the vehicle from the line segment, where the characteristic line segment includes a forward characteristic line segment and/or a lateral characteristic line segment; and generating the parking space according to the characteristic line segment and the target grid map.

In the embodiments of the present disclosure, a characteristic line segment corresponding to the vehicle is selected, so as to generate the parking space based on the characteristic line segment and the target grid map, and thus a parking space corresponding to the vehicle can be determined, that is, the determined parking space can meet a forward demand and/or a sideward demand of the vehicle, thereby improving the reliability and accuracy in parking space detection and generation.

In some embodiments, the generating a parking space according to the characteristic line segment and the target grid map includes:

selecting a plurality of grids corresponding the vehicle from the target grid map based on the characteristic line segment; and determining an area corresponding to the selected plurality of grids to be the parking space.

In the embodiments of the present disclosure, a plurality of corresponding grids are selected from the target grid map according to the characteristic line segment, and an area corresponding to the selected plurality of grids is taken as a parking space, and thus a single-boundary or double-boundary parking space (such as a spatial parking space) can be detected, thereby realizing flexible and reliable parking space detection, and enabling the method of the embodiments of the present disclosure to have a strong universality.

In some embodiments, after determining the area corresponding to the selected plurality of grids to be the parking space, the method further includes:

in response to that a plurality of parking spaces include a same grid, and that a number of the same grid is greater than a preset first threshold, performing a merging processing on the plurality of parking spaces that include the same grid.

In the embodiments of the present disclosure, by performing the merging processing, on the one hand, reliability of determined parking space can be improved, and on the other hand, safety and reliability of subsequent parking can be improved.

In some embodiments, after generating the parking space, the method further includes:

screening the parking space in response to that at least part of grids corresponding to the parking space is occupied by the obstacle point and that a number of grids occupied by the obstacle point is greater than a preset second threshold.

In the embodiments of the present disclosure, on the one hand, by screening the parking space, the accuracy and practicality of the determined parking space can be improved; and on the other hand, the parking space is screened after the parking space is determined, which can reduce the times of screening, reduce computing consumption and costs, thereby achieving a technical effect of saving resources and improving efficiency.

In some embodiments, after generating the parking space, the method further includes:

collecting the obstacle point in the target grid map based on a width direction of the parking space, and adjusting a width of the parking space according to a collected first obstacle point set; and/or, collecting the obstacle point in the target grid map based on a width direction of the parking space to obtain a first obstacle point set, and collecting the obstacle point in the target grid map based on a depth direction of the parking space to obtain a second obstacle point set, and adjusting an angle of the parking space according to the first obstacle point set and the second obstacle point set.

In the embodiments of the present disclosure, after generating the parking space, the width and/or the angle of the parking space is adjusted, and thus the accuracy and reliability of finally determined parking space can be improved and the safety of subsequent parking can be improved.

In some embodiments, the collecting the obstacle point in the target grid map based on a width direction of the parking space includes:

obtaining, from the target grid map and based on the parking space, an obstacle point within one preset parking space width on left and right sides of the parking space in the width direction of the parking space respectively, to obtain the first obstacle point set; and the adjusting a width of the parking space according to a collected first obstacle point set includes: adjusting the parking space in the width direction to a width area that has no obstacle point and that is between one preset parking space width on the left side of the parking space and one preset parking space width on the right side of the parking space according to the first obstacle point set, and adjusting the width of the parking space based on the width area.

In some embodiments, the collecting the obstacle point in the target grid map based on a width direction of the parking space to obtain the first obstacle point set includes:

obtaining, from the target grid map and based on the parking space, an obstacle point within one preset parking space width on left and right sides of the parking space in the width direction of the parking space respectively, to obtain the first obstacle point set; and the collecting the obstacle point in the target grid map based on a depth direction of the parking space to obtain the second obstacle point set includes: obtaining, from the target grid map and based on the parking space, an obstacle point within one preset parking space depth on the left and right sides of the parking space in the depth direction of the parking space respectively, to obtain the second obstacle point sets; and the adjusting an angle of the parking space according to the first obstacle point set and the second obstacle point set includes: fitting the first obstacle point set and the second obstacle point set, respectively, to generate an adjustment angle of the parking space, and adjusting the angle of the parking space according to the adjustment angle and a reference angle.

In some embodiments, the generating a target grid map corresponding to the ultrasonic information includes:

collecting positioning information of the vehicle relative to a preset grid map; and updating the preset grid map with the ultrasonic information according to the positioning information and internal and external parameters of ultrasonic sensors, to generate the target grid map.

According to another aspect of the embodiments of the present disclosure, the embodiments of the present disclosure also provides a parking space detection apparatus, the apparatus including:

a first collecting module, configured to collect ultrasonic information during a moving process of a vehicle;

a first generating module, configured to generate a target grid map that corresponds to the ultrasonic information, the target grid map including an obstacle point;

a recognition module, configured to perform feature recognition on the target grid map to obtain a line segment; and a second generating module, configured to generate a parking space according to the line segment and the target grid map, so as to display the parking space.

In some embodiments, the second generating module is configured to select a characteristic line segment corresponding to the vehicle from the line segment, where the characteristic line segment includes a forward characteristic line segment and/or a lateral characteristic line segment, and generate the parking space according to the characteristic line segment and the target grid map.

In some embodiments, the second generating module is configured to select a plurality of grids corresponding to the vehicle from the target grid map based on the characteristic line segment, and determine an area corresponding to the selected plurality of grids to be the parking space.

In some embodiments, the second generating module is configured to, in response to that a plurality of parking spaces include a same grid, and a number of the same grid is greater than a preset first threshold, perform a merging processing on the plurality of parking spaces including the same grid.

In some embodiments, the detection apparatus further includes:

a screening module, configured to screen the parking space in response to that at least part of the grids corresponding to the parking space is occupied by the obstacle point and a number of grids occupied by the obstacle point is greater than a preset second threshold.

In some embodiments, the detection apparatus further includes:

a second collecting module, configured to collect the obstacle point in the target grid map based on a width direction of the parking space, and a first adjusting module, configured to adjust a width of the parking space according to a collected first obstacle point set; and/or, a second collecting module, configured to collect the obstacle point in the target grid map based on a width direction of the parking space to obtain a first obstacle point set; and a third collecting module, configured to collect the obstacle point in the target grid map in a depth direction of the parking space to obtain a second obstacle point set, and a second adjusting module, configured to adjust an angle of the parking space according to the first obstacle point set and the second obstacle point set.

In some embodiments, the second collecting module is configured to obtain, from the target grid map and based on the parking space, the obstacle point within one preset parking space width on left and right sides of the parking space in the width direction of the parking space respectively, to obtain the first obstacle point set; and the first adjusting module is configured to adjust the parking space in a width direction to a width area that has no obstacle point and that is between one preset parking space width on the left side of the parking space and one preset parking space width on the right side of the parking space according to the first obstacle point set, and adjust the width of a parking space based on the width area.

In some embodiments, the second collecting module is configured to obtain, from the target grid map and based on the parking space, the obstacle point within one preset parking space width on left and right sides of the parking space in the width direction of the parking space respectively, to obtain the first obstacle point set;

the third collecting module is configured to obtain, from the target grid map and based on the parking space, the obstacle point within one preset parking depth on the left and right sides of the parking space in the depth direction of the parking space respectively, to obtain the second obstacle point set; and the second adjusting module is configured to fit the first obstacle point set and the second obstacle point set, respectively, to generate an adjustment angle of the parking space, and adjust the angle of the parking space according to the adjustment angle and a reference angle.

In some embodiments, the first generating module is configured to collect positioning information of the vehicle relative to a preset grid map, and update the preset grid map with the ultrasonic information according to the positioning information and internal and external parameters of ultrasonic sensors, to generate the target grid map.

According to another aspect of the embodiments of the present disclosure, the embodiments of the present disclosure also provide an electronic device, including:

at least one processor; and a memory communicatively connected with the at least one processor; where, the memory stores instructions executable by the at least one processor, and the instructions when executed by the at least one processor, cause the at least one processor to execute the method according to any one of the abovementioned embodiments.

According to another aspect of an embodiment of the present disclosure, the embodiments of the present disclosure further provides a vehicle, the vehicle includes the parking space detection apparatus according to any one of the above embodiments; or, the electronic device as described in the abovementioned embodiments.

According to another aspect of the embodiments of the present disclosure, the embodiments of the present disclosure also provides a non-transitory computer-readable storage medium storing computer instructions, the computer instructions are configured to cause the computer to execute a method according to any one of the abovementioned embodiments.

According to another aspect of the embodiments of the present disclosure, the embodiments of the present disclosure also provides a parking space detection method, the method includes:

generating a target grid map that corresponds to the collected ultrasonic information and includes an obstacle point;

performing feature recognition on the target grid map to obtain a line segment; and generating a parking space according to the line segment and the target grid map.

The embodiments of the present disclosure provide a parking space detection method and apparatus, an electronic device, a vehicle, and a storage medium, where ultrasonic information is collected during a moving process of a vehicle, a target grid that corresponds to the ultrasonic information and includes an obstacle point is generated, feature recognition is performed on the target grid map to obtain a line segment, and a parking space is generated according to the line segment and the target grid map, to display the parking space. By generating a target grid map corresponding to the ultrasonic information and generating a parking space based on the target grip map and a line segment obtained by performing feature recognition on the target grid map, on the one hand, a disadvantage of a limited range of application in the prior art caused by that the detection of a parking space (for example, a spatial parking space) requires a travelling direction of a vehicle to be parallel with a side of the obstacle and requires the vehicle to be close to the obstacle is avoided, thereby achieving a relatively wide range of application; and on the other hand, a disadvantage of a larger error range in the prior art caused by a comparison between an interval of jump edges and a threshold is avoided, thereby achieving a technical effect of improving the detection accuracy. Moreover, since the target grid map corresponding to the ultrasonic information is generated, and the parking space is generated based on the target grid map and the line segment obtained by performing feature recognition, the parking space detection method according to the embodiments of the present disclosure has high versatility, and can support detection of a spatial perpendicular parking space, a spatial parallel parking space, a spatial oblique parking space and the like which have a single and double boundaries, and can also lower requirements for a travelling direction and a distance of a vehicle in the detection of a parking space (for example, a spatial parking space).

Other effects of the foregoing optional implementations will be described below in combination with specific embodiments.

BRIEF DESCRIPTION OF THE DRAWINGS

The accompanying drawings are used to better understand this solution, and do not constitute a limitation of this disclosure, where.

DETAILED DESCRIPTION OF THE EMBODIMENTS

The following describes exemplary embodiments of the present disclosure with reference to the accompanying drawings, which includes various details of the embodiments of the present disclosure to facilitate understanding, and should be considered merely exemplary. Therefore, those skilled in the art should recognize that various changes and modifications can be made to the embodiments described herein without departing from the scope and spirit of the embodiments of the present disclosure. Also, for clarity and conciseness, descriptions of well-known functions and structures are omitted in the following description.

According to an aspect of the embodiments of the present disclosure, an embodiment of the present disclosure provides a parking space detection method.

Figure 1:
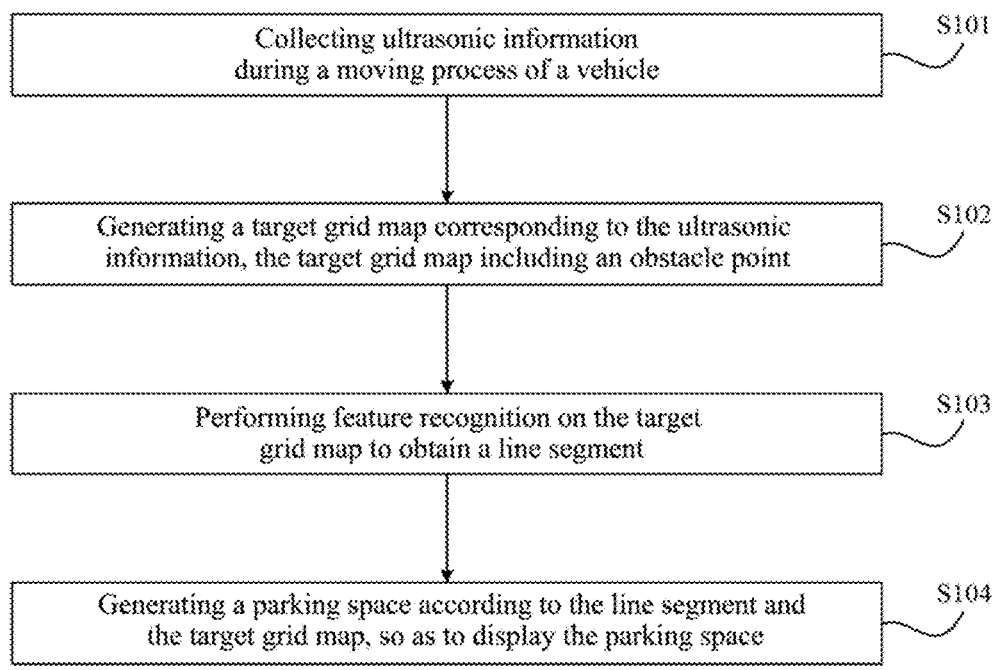
FIG. 1 is a schematic flowchart of a parking space detection method according to an embodiment of the present disclosure.

Please refer to FIG. 1, which is a schematic flowchart of a parking space detection method according to an embodiment of the present disclosure.

As shown in FIG. 1, the method includes:

S101: collecting ultrasonic information during a moving process of a vehicle.

An executive entity of the parking space detection method according to the embodiment of the present disclosure may be a parking space detection apparatus, and a detection apparatus may be an ultrasonic system (including a sensor and a processor), a radar, a CPU processor, a car box, a domain controller, or a car networking chip, and so on.

It is worth noting that the parking space in the embodiments of the present disclosure may be a spatial parking space, and the spatial parking space refers to a parking space that is not defined by parking space lines but determined by an obstacle (including a vehicle, a wall, a pillar, a pole, etc.) and a position of the obstacle. In other words, there is a vehicle parked or an obstacle such as a wall or a pillar on at least one boundary of the parking space. The spatial parking space may be divided into a double-boundary spatial parking space and a single-boundary spatial parking space based on whether there are obstacles on boundaries, where the double-boundary spatial parking space means that there are obstacles on both the left and right boundaries of the spatial parking space, and the single-boundary space parking space means that there is an obstacle on either the left or right boundary of the spatial parking space.

When the executive entity of the parking space detection method according to the embodiment of the present disclosure is an ultrasonic system, an ultrasonic sensor in the ultrasonic system may be used to collect the ultrasonic information.

For example, an ultrasonic sensor includes a transmitter, a receiver, a controller and a power supply. The transmitter generates an ultrasonic wave through a vibration of a vibrator and radiates the ultrasonic wave into air. The receiver: when a vibrator receives an ultrasonic wave, the vibrator generates a corresponding mechanical vibration according to the ultrasonic wave and the receiver converts the mechanical vibration into electrical energy as an output of the receiver. The controller controls ultrasonic wave transmission of the transmitter by using an integrated circuit, and determines whether the receiver receives the ultrasonic information. The power supply: the ultrasonic sensor may be powered by an external DC power supply which supplies to a sensor for working via an internal voltage regulator circuit.

S102: generating a target grid map corresponding to the ultrasound information, the target grid map including an obstacle point.

The target grid map is a grid map used for characterizing an occupation ratio of an obstacle. That is, the target grid map is a map including a plurality of grids, and a ratio of grids occupied by the obstacle corresponding to the ultrasonic information can be determined based on the target grid map.

Based on the principle of the abovementioned ultrasonic sensor, it can be seen that whether there is an obstacle may be determined by analyzing the ultrasonic information, and when there is an obstacle, a grid occupied by the obstacle may be determined by a processor of an ultrasound system, so as to generate a target grid map.

S103: performing feature recognition on the target grid map to obtain a line segment.

The target grid map may be performed with feature recognition through Hough transformation to quickly obtain a corresponding line segment.

S104: generating a parking space according to the line segment and the target grid map, so as to display the parking space.

In order to provide a deeper understanding of the parking space detection method of the embodiments of the present disclosure, the method of the embodiments of the present disclosure is now described in detail with reference to the application scenario shown in FIG. 2.

Figure 2:
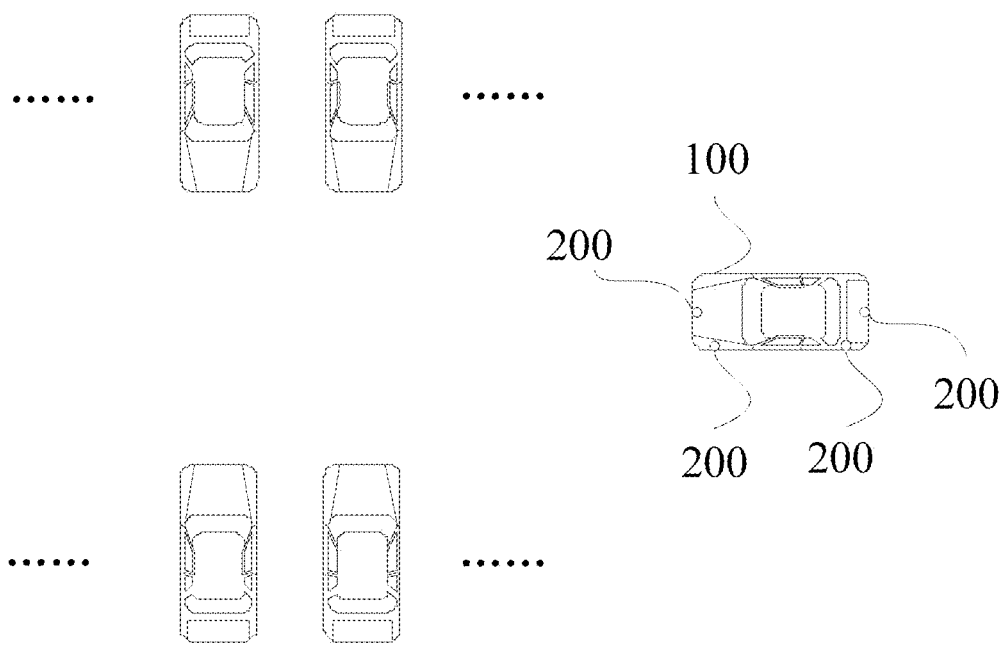
FIG. 2 is a schematic diagram of an application scenario of a parking space detection method according to an embodiment of the present disclosure.

As shown in FIG. 2, ultrasonic sensors 200 are provided on a vehicle 100, and at least one ultrasonic sensor 200 is provided on each of the left and right sides of the vehicle 100 (FIG. 2 exemplarily shows two ultrasonic sensors provided on the left side of the vehicle), and at least one ultrasonic sensor 200 is provided on each of the front and rear sides of the vehicle 100 (FIG. 2 exemplarily shows one ultrasonic sensor provided on the front side of the vehicle and one ultrasonic sensor provided on provided on the rear side of the vehicle). Both the ultrasonic sensors 200 provided on the front and rear sides of the vehicle 100 and the ultrasonic sensors 200 provided on the left and right sides of the vehicle 100 may all be connected to a processor (not shown in the figure), so as to provide a better parking space detection result, where the ultrasonic sensor 200 and the processor are included in an ultrasonic system.

In some embodiments, the ultrasonic sensors 200 on the left and right sides of the vehicle 100 may be ultrasonic sensors for long-distance detection, and the ultrasonic sensors 200 on the front and rear sides of the vehicle 100 may be ultrasonic sensors for short-distance detection.

It is worth noting that the long-distance detection and the short-distance detection are only relative concepts, that is, a detection distance of the ultrasonic sensors on the left or right side of the vehicle 100 is relatively large compared with that of the ultrasonic sensors on the front and rear sides of the vehicle 100. Similarly, a detection distance of the ultrasonic sensors on the front and rear sides of the vehicle 100 is relatively short compared with that of the ultrasonic sensors on the left and right sides of the vehicle 100.

Furthermore, it should be noted that the locations and the number of the ultrasonic sensors shown in FIG. 2 are only for exemplary description, and should not be understood as limiting the scope of the embodiments of the present disclosure.

Figure 3:
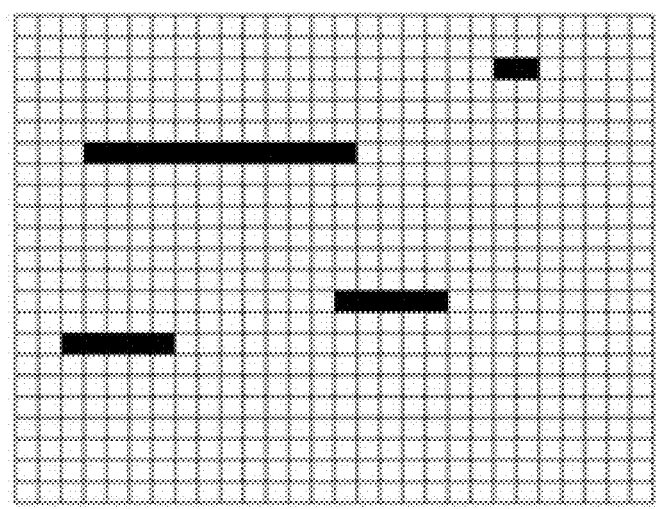
FIG. 3 is a schematic diagram of a target grid map according to an embodiment of the present disclosure.

After the vehicle 100 enters a parking lot, the ultrasonic sensors 200 may collect ultrasonic information and transmit the collected ultrasonic information to the processor, and the processor analyzes the ultrasonic information and generates a corresponding target grid map, as can be seen in FIG. 3 for details (FIG. 3 is a schematic diagram of a target grid map according to an embodiment of the present disclosure).

Figure 4:
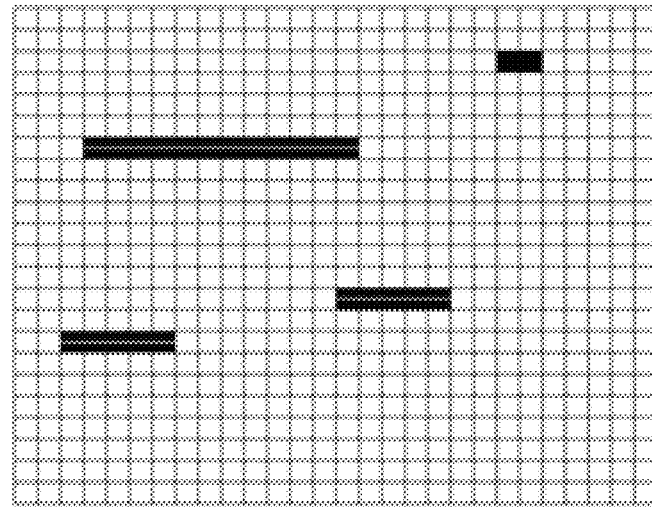
FIG. 4 is a schematic diagram of a target grid map after straight segments are generated, according to an embodiment of the present disclosure.

The processor may invoke a pre-stored Hough transformation to perform feature recognition on the target grid map and generate a straight line segment, as can be seen in FIG. 4 for details (FIG. 4 is a schematic diagram of a target grid map after straight line segments are generated, according to an embodiment of the present disclosure).

Figure 5:
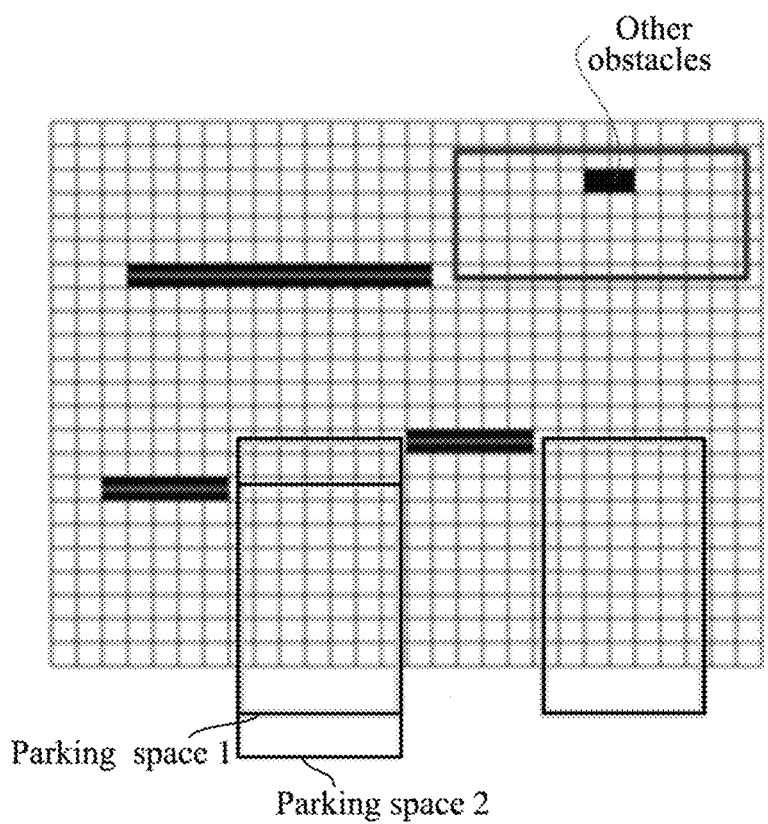
FIG. 5 is a schematic diagram of a generated parking space according to an embodiment of the present disclosure.

The processor generates a parking space according to the line segment and the target grid map, as can be seen in FIG. 5 for details (FIG. 5 is a schematic diagram of a generated parking space according to an embodiment of the present disclosure).

It is worth noting that the abovementioned examples are merely for exemplary illustration of application scenarios of the embodiments of the present disclosure, and shall not be understood as a limitation to the embodiments of the present disclosure.

In some other embodiments, when an executive entity of the parking space detection method is a car box, ultrasonic sensors may transmit collected ultrasonic information to the car box, which by turn generates a parking space. And a display may be integrated with the car box, so that the display on the car box displays the parking space.

Similarly, in some other embodiments, when the executive entity of the parking space detection method is a radar, the radar may collect ultrasonic information and transmit the collected ultrasonic information to a processor that is provided in the radar, and a parking space is generated by the processor provided in the radar.

Similarly, in other embodiments, when an executive entity of the parking space detection method is a CPU processor, ultrasonic sensors may transmit collected ultrasonic information to the CPU processor, and the CPU processor generates a parking space.

Similarly, in some other embodiments, if an executive entity of the parking space detection method is a domain controller, ultrasonic sensors may transmit collected ultrasonic information to the domain controller, and the domain controller generates a parking space.

Similarly, in some other embodiments, when an executive entity of the parking space detection method is a car networking chip, ultrasonic sensors may transmit collected ultrasonic information to the car networking chip, and the car networking chip generates a parking space.

In the embodiments of the present disclosure, a new parking space detection method is provided. The method includes: collecting ultrasonic information during a moving process of a vehicle, generating a target grid map corresponding to the ultrasonic information, and performing feature recognition on the target grid map to obtain a line segment, and generating a parking space according to the line segment and the target grid map, so as to display the parking space. By generating a target grid map corresponding to the ultrasonic information and generating a parking space based on the target grip map and a line segment obtained by performing feature recognition on the target grid map, on the one hand, a disadvantage of a limited range of application in the prior art caused by that the detection of a parking space (for example, a spatial parking space) requires a travelling direction of a vehicle to be parallel with a side of an obstacle and requires the vehicle to be close to the obstacle is avoided, thereby achieving a relatively wide range of application; and on the other hand, a disadvantage of a larger error range in the prior art caused by a comparison between an interval of jump edges and a threshold is avoided, thereby achieving a technical effect of improving the detection accuracy.

Moreover, since a target grid map corresponding to the ultrasonic information is generated, and a parking space is generated based on the target grid map and a line segment obtained by performing feature recognition on the target grid map, the parking space detection method according to the embodiments of the present disclosure is highly versatile, and can support detection of a spatial perpendicular parking space, a spatial parallel parking space, a spatial oblique parking space and the like which have a single boundary or double boundaries, and can also lower requirements for a travelling direction and a distance of a vehicle in the detection of a parking space.

In some embodiments, S104 includes:

S41: selecting a characteristic line segment corresponding to the vehicle from the line segment, where the characteristic line segment includes a forward characteristic line segment and/or a lateral characteristic line segment.

In this step, a characteristic line segment corresponding to the vehicle is selected from the line segment. A characteristic line segment corresponding to the vehicle refers to a line segment corresponding to an obstacle in a direction along the width or the length of the vehicle, where the forward characteristic line segment is the line segment corresponding to the obstacle in the direction along the width of the vehicle, and the lateral characteristic line segment is the line segment corresponding to the obstacle in the direction along the length of the vehicle.

For example, a line segment of 1 to 2 meters is reserved as the forward characteristic line segment of the vehicle, and a line segment of 4 to 6 meters is reserved as the lateral characteristic line segment of the vehicle.

S42: generating the parking space according to the characteristic line segment and the target grid map.

In the embodiments of the present disclosure, a line segment (namely a forward characterize line segment) that conforms to the width of the vehicle and a line segment (namely a lateral characterize line segment) that conforms to the length of the vehicle are determined by screening the line segment, so as to determine a parking space conforming to a width characteristic and a length characteristic of the vehicle, thereby achieving a technical effect that the determined parking space is reliable and accurate.

In some embodiments, S42 includes:

S421: selecting a plurality of grids corresponding to the vehicle from the target grid map based on the characteristic line segment.

S422: determining an area corresponding to the selected plurality of grids to be the parking space.

Based on the abovementioned examples, it can be seen that a spatial parking space may be a double-boundary spatial parking space or a single-boundary spatial parking space.

Taking the forward characteristic line segment as an example, when there is only one forward characteristic line segment, a plurality of grids that satisfy the width and the length of the vehicle may be selected from the target grid map based on the forward characteristic line segment, and an area corresponding to the selected plurality of grids may be determined to be the parking space.

When there are a plurality of forward characteristic line segments, the parking space may be determined based on each one of the forward characteristic line segments, respectively.

Similarly, taking a lateral characteristic line segment as an example, when there is only one lateral characteristic line segment, a plurality of grids that satisfy the width and the length of the vehicle may be selected from the target grid map based on the lateral characteristic line segment, and an area corresponding to selected plurality of grids may be determined to be the parking space.

When there are a plurality of lateral characteristic line segments, the parking space may be determined based on each one of the lateral characteristic line segments, respectively.

In some embodiments, after S422, the method further includes:

S423: in response to that a plurality of parking spaces includes a same grid and a number of the same grid is greater than a preset first threshold, performing a merging processing on the plurality of parking spaces including the same grid.

This step may specifically include: judging whether the plurality of parking spaces include a same grid, if yes, continuing to judge whether a number of the same grid is greater than a first threshold, if yes, performing a merging processing on the plurality of parking spaces including the same grid, to obtain one parking space.

The first threshold may be set based on demands.

In some embodiments, the first threshold is greater than or equal to half of the number of grids corresponding to one parking space.

In some other embodiments, whether to perform a merging processing on the plurality of parking spaces may be determined by determining an area occupied by the same grid.

For example, when the area occupied by the same grid is greater than half of the area corresponding to one parking space, the merging processing is performed on the plurality of parking spaces.

In some embodiments, the merging processing may be a process of averaging, such as averaging positions of the forward characteristic line segments of a plurality of parking spaces in the target grid map to obtain a position of a merged forward characteristic line segment; averaging positions of the lateral characteristic line segments of a plurality of parking spaces in a target grid map to obtain a position of a merged lateral characteristic line segment.

As shown in FIG. 5, a parking space 1 and a parking space 2 include some same grids, that is, the parking space 1 and the parking space 2 are partially overlapped, and the number of the same grids is greater than half of the total number of grids of the parking space 1 (or the parking space 2), then a merging processing is performed on the parking space 1 and the parking space 2 to obtain one parking space. Please refer to FIG. 6, which is a schematic diagram after merging according to an embodiment of the present disclosure, where a parking space is obtained by merging the parking space 1 and the parking space 2 and marked as parking space 3.

In the embodiments of the present disclosure, a merging processing is performed to a plurality of parking spaces including the same grid, which is equivalent to a correction to the plurality of parking spaces including the same grid, thereby ensuring the reliability of the parking spaces, and at the same time, ensuring as much as possible that the vehicle keeps a same distance from obstacles (such as vehicles) on both sides during parking so as to avoid scratching the obstacles on either side, and thus improving the safety of parking.

Figure 7:
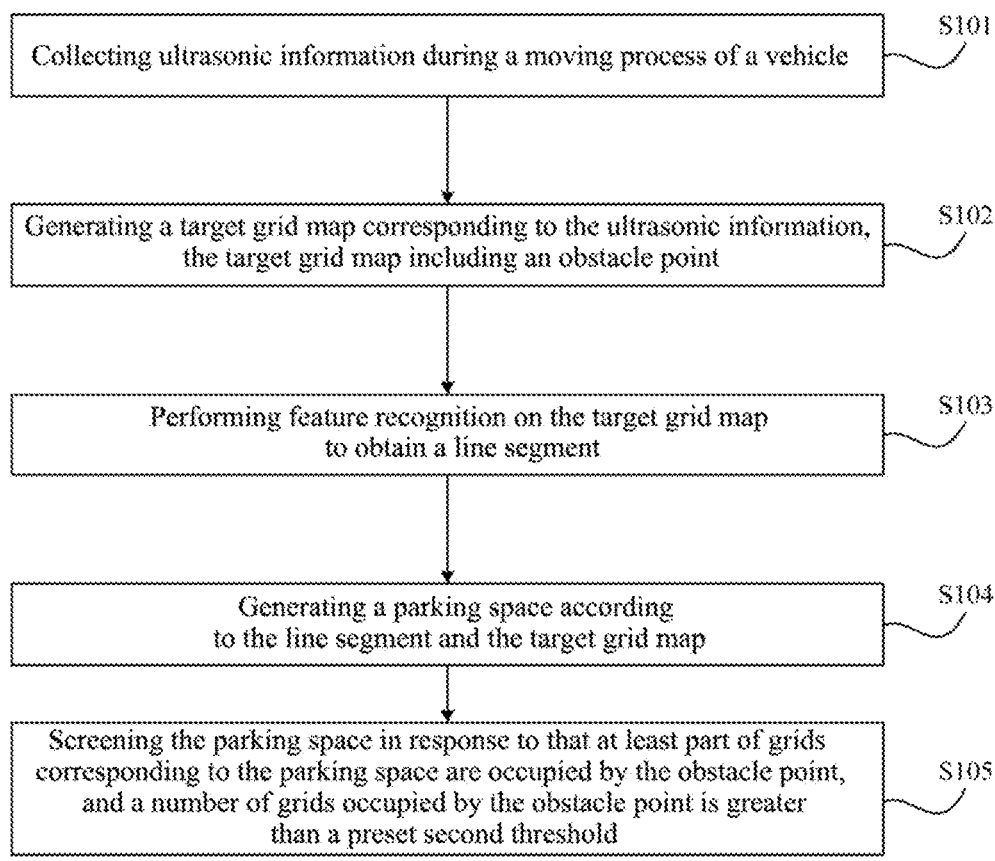
FIG. 7 is a schematic flowchart of a parking space detection method according to another embodiment of the present disclosure.

With reference to FIG. 7 (which is a schematic flowchart of a parking space detection method of another embodiment of the present disclosure), it can be seen that, in some embodiments, after S104, the method further includes:

S105: screening the parking space in response to that at least part of grids corresponding to the parking space is occupied by the obstacle point and a number of grids occupied by the obstacle point is greater than a preset second threshold.

Similarly, the second threshold may also be set based on demands.

Figure 6:
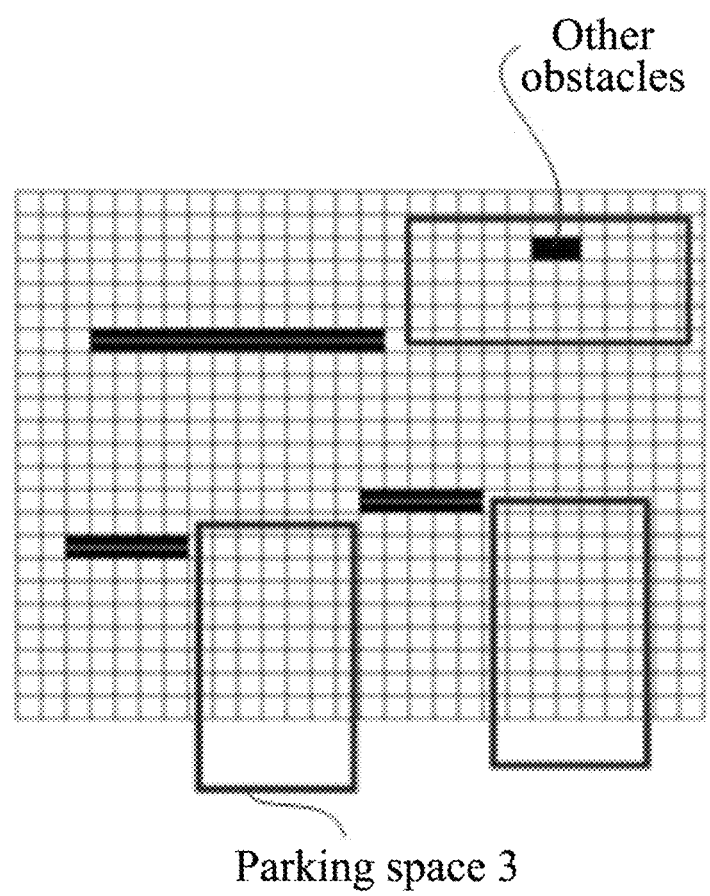
FIG. 6 is a schematic diagram after merging according to an embodiment of the present disclosure.

With reference to FIG. 5 and FIG. 6, it can be seen that in some grids corresponding to the parking space, there may be obstacle points corresponding to other obstacles, as "other obstacle" marked in FIG. 5 and FIG. 6.

Figure 8:
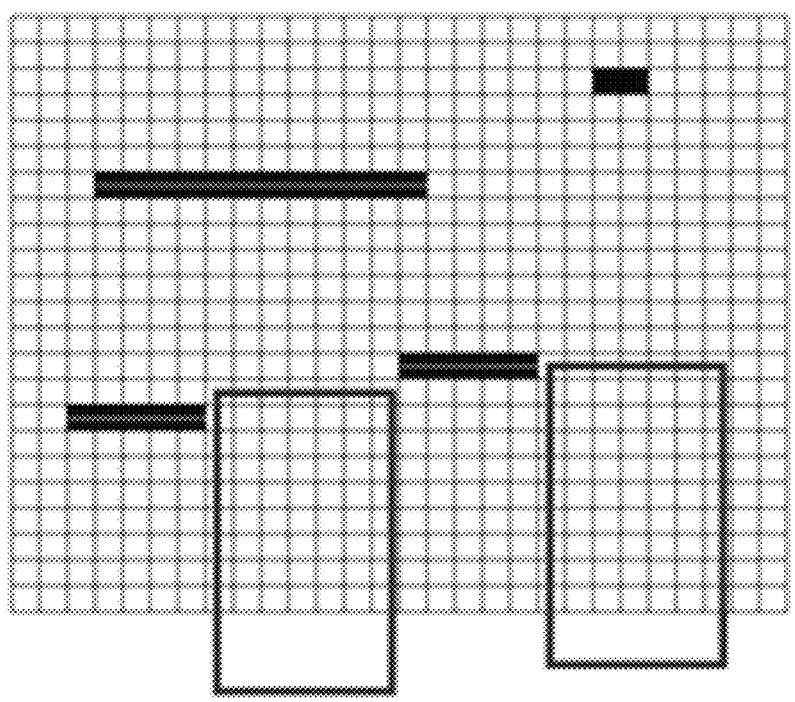
FIG. 8 is a schematic diagram after screening according to an embodiment of the present disclosure.

Here, "other obstacles" is used to indicate that there may be a "no parking" sign placed in the parking space, or there are sundries in the parking space, which make it impossible to park. Specifically, a schematic diagram after screening can be seen in FIG. 8.

In the embodiment of the present disclosure, the parking space is screened after being detected, which can avoid a disadvantage of large computing consumption caused by detecting other obstacles during parking space detection, so as to achieve technical effects of saving computing resources, improving the efficiency of parking space determination and improving the reliability of the parking space determination.

Figure 9:
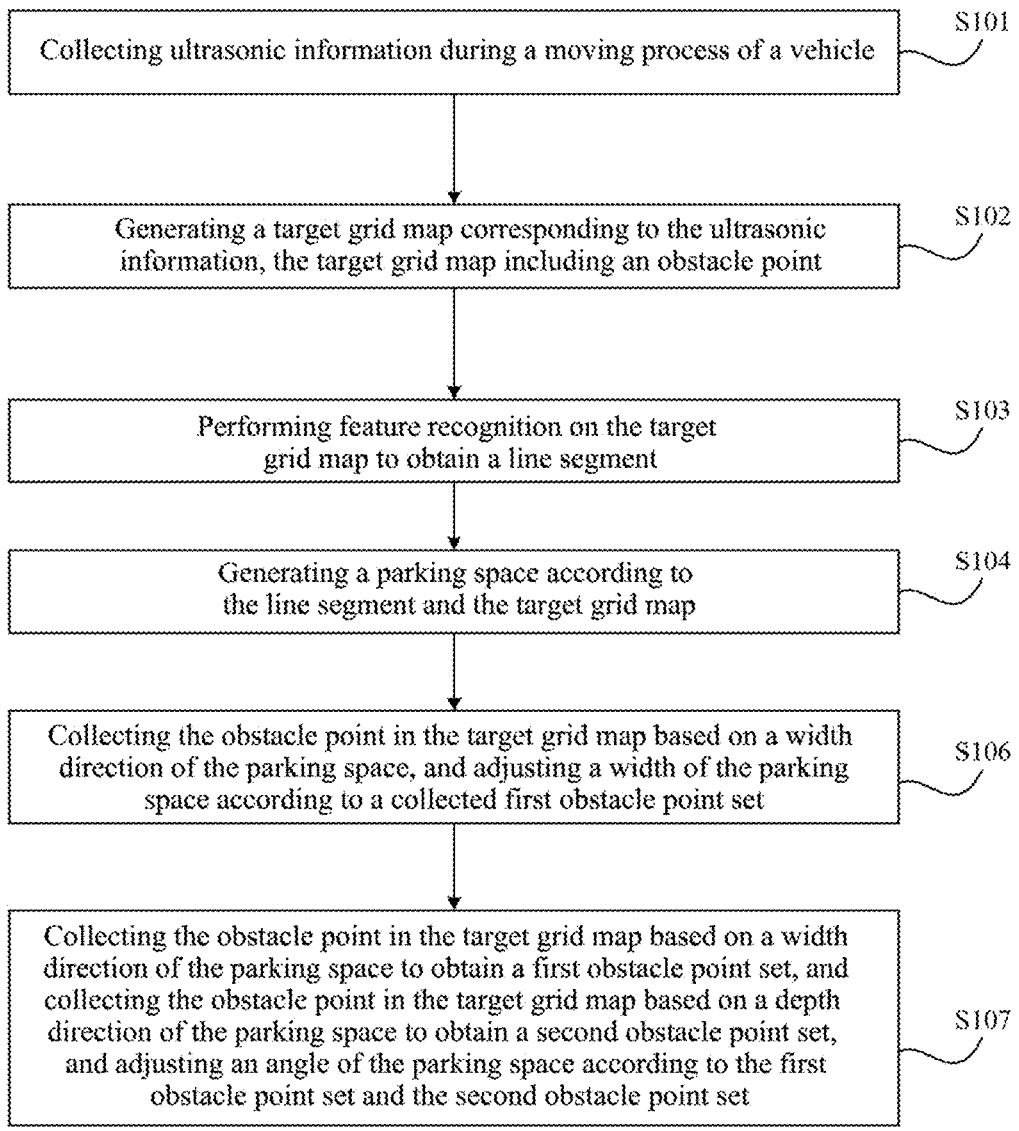
FIG. 9 is a schematic flowchart of a parking space detection method according to another embodiment of the present disclosure.

With reference to FIG. 9 (which is a schematic flowchart of a parking space detection method according to another embodiment of the present disclosure), it can be seen that, in some embodiments, after S104, the method further includes implementing S106 and/or S107:

S106: collecting the obstacle point in the target grid map based on a width direction of the parking space, and adjusting a width of the parking space according to a collected first obstacle point set.

Here, the obstacle point is a grid in the target grid map which is generated based on the ultrasonic information and which is used to indicate that an obstacle may exist, and position information of a grid corresponding to the obstacle point in the target grid map is position information corresponding to the obstacle.

In this step, it is equivalent to adjust the width of the parking space based on the first obstacle point set.

S107: collecting the obstacle point in the target grid map based on a width direction of the parking space to obtain a first obstacle point set, and collecting the obstacle point in the target grid map based on a depth direction of the parking space to obtain a second obstacle point set, and adjusting an angle of the parking space according to the first obstacle point set and the second obstacle point set, so as to display an adjusted parking space, and park based on the adjusted parking space.

In this step, it is equivalent to adjusting an angle of the parking space based on the first obstacle point set and the second obstacle point set.

In some embodiments, the collecting of the first obstacle point set may specifically include: obtaining, from the target grid map and based on the parking space, the obstacle point within one preset parking space width on left and right sides of the parking space in the width direction of the parking space respectively, to obtain a first obstacle point set.

Furthermore, the adjusting the width of the parking space according to the collected first obstacle point set includes: adjusting, the parking space in the width direction to a width area that has no obstacle point and that is between one preset parking space width on the left side of the parking space and one preset parking space width on the right side of the parking space according to the first obstacle point set, and adjusting the width of the parking space based on the width area.

Figure 10:
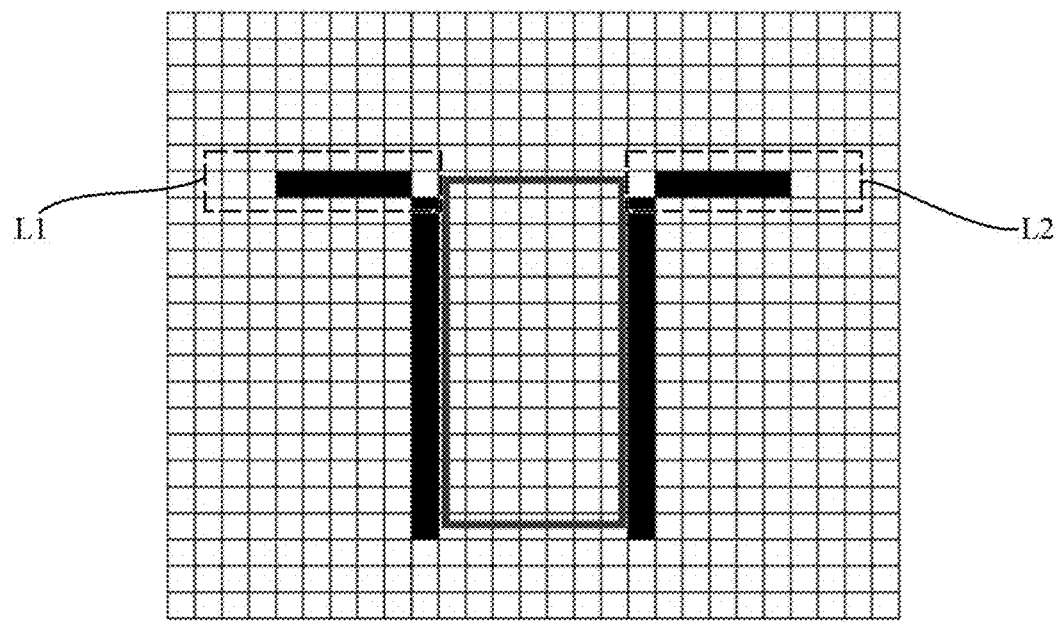
FIG. 10 is a schematic diagram of a width adjustment according to an embodiment of the present disclosure.

In order to provide a clearer understanding of the principle of adjusting the width of the parking space, the principle of adjusting the width is now explained in detail with reference to FIG. 10.

It could be understood that, after the vehicle is parked in the parking space, left and right doors should be able to open normally, that is, when the vehicle is parked in the parking space, the left and right doors will not collide with other vehicles or obstacles when being opened. Therefore, in the embodiments of the present disclosure, the width of the parking space is adaptively adjusted.

Specifically, the width direction of the parking space includes a width direction of the parking space on the left side, that is, an opening direction of the left door of the vehicle, and a width direction of the parking space on the right side, that is, an opening direction of the right door of the vehicle. A range for obtaining the obstacle point in the width direction of the parking space on the left side is shown as L1 in FIG. 10, and a range for obtaining the obstacle point in the width direction of the parking space on the right side is shown as L2 in FIG. 10. It is worth noting that, as shown in FIG. 10, the obstacle point may not be included in both the ranges for obtaining the obstacle point, but may only be included in part of the ranges for obtaining the obstacle point.

The parking space is adjusted in the width direction to a width area that has no obstacle points in the middle according to the first obstacle point set, and a width of the width area is determined to be the width of the parking space. Specifically, a middle position of the width area is determined as a middle position of the width of the parking space.

For example, straight line fitting is preformed to the points in L1 by way of Random Sample Consensus (RANdom Sample Consensus, RANSAC) straight line fitting to obtain a straight line segment l1, and straight line fitting is performed to the points in L2 by way of RANSAC straight line fitting to obtain a straight line segment l2, and the width of the parking space is adjusted based on two adjacent endpoints of l1 and l2.

In some embodiments, an angle of the parking space may be adjusted on the basis of the abovementioned examples. Principle of adjusting an angle in an embodiment of the present disclosure will now be described in detail with reference to FIG. 11.

For example, after the first obstacle point set is obtained based on the method of the abovementioned example, the second obstacle point set can be then obtained, where obtaining the second obstacle point set may specifically include: obtaining, from the target grid map and based on the parking space, the obstacle point within one preset parking space depth on left and right sides of the parking space in the depth direction of the parking space respectively, to obtain the second obstacle pint set.

Figure 11:
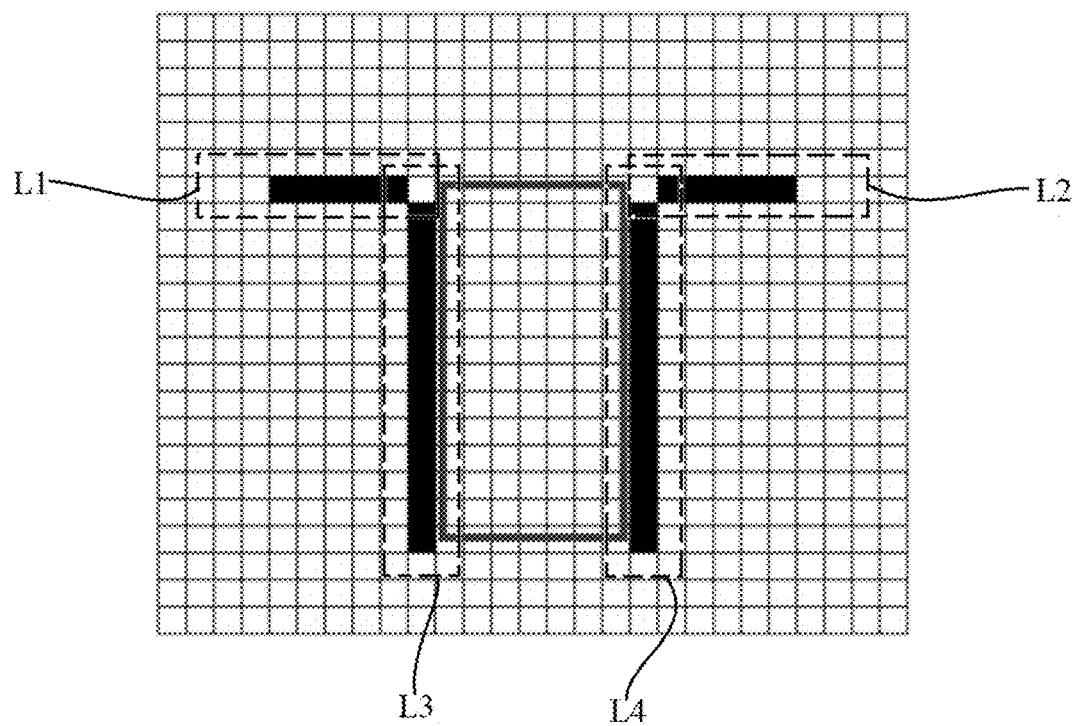
FIG. 11 is a schematic diagram of an angle adjustment according to an embodiment of the present disclosure.

Similarly, with reference to FIG. 11, it can be seen that a range for obtaining the obstacle point in the depth direction of the parking space on the left side is shown as L3 in FIG. 11, and a range for obtaining the obstacle point in the depth direction of the parking space on the right side is shown as L4 in FIG. 11. It is worth noting that, as shown in FIG. 11, the obstacle point may not be included in both the ranges for obtaining the obstacle point, but may only be included in part of the ranges for obtaining the obstacle point.

The first obstacle point set and the second obstacle point set are fitted, respectively, to generate an adjustment angle of the parking space, and the angle of the parking space is adjusted according to the adjustment angle and a reference angle.

Specifically, L1 is fitted to get a straight line segment l1 and an angle $\angle 1$ of the straight line segment l1 based on the width direction of the vehicle; L3 is fitted to get a straight line segment l3 and an angle $\angle 3$ of the straight line segment l3 based on the depth direction of the vehicle; when a reference angle is 90°, then the adjustment angle $\angle 4=((\angle 1+90°)+\angle 3)/2$.

Only the width direction and the depth direction on the left side is taken for an exemplary explanation in this example, principle of the width direction and the right depth direction on the right side is the same, and will not be repeated herein.

The RANSAC straight line fitting method may be used to fit obstacle points into a straight line, the RANSAC straight line fitting method is efficient and accurate while the amount of data is small, and also has strong robustness to external points. Therefore, the straight line fitting is performed by using the RANSAC straight line fitting method, which can achieve technical effects in improving the accuracy and saving the calculation costs.

That is, in the embodiments of the present disclosure, an obstacle point area of one parking space width in the width direction of the parking space is obtained on the left and right sides of the parking space, respectively, and an obstacle point area of one parking space depth in the depth direction of the parking space is obtained on the left and right sides of the parking space, respectively, from the target grid map. The RANSAC straight line fitting method is used to fit the obstacle points in the above four areas, i.e. L1, L2, L3 and L4 as shown in FIG. 11, into straight lines respectively. A difference between an angle of a straight line formed by the obstacle point in the depth direction and an angle of a straight line formed by the obstacle point in the width direction is 90°, therefore, according to angles of the straight lines fitted in the four areas, the parking space can be adjusted accordingly in an angular direction.

In some embodiments, S102 includes:

S21: collecting positioning information of the vehicle relative to a preset grid map.

The preset grid map is determined based on a parking lot where the vehicle is located, and the size of the grid map may be set based on requirements, history records, tests and the like, such as 3 m×3 m, and a coordinate system of the grid map may be a coordinate system determined based on position information of the parking lot; the coordinate system of the grid map may also be a coordinate system determined based on position information of the vehicle, for example, a center point of the vehicle is taken as the origin of a coordinate of the grid map, and a driving direction of the vehicle is taken as the Y axis of the coordinate, a left and right direction of the vehicle body is the X axis of the coordinate. The coordinate system of the grid map may also be a preset coordinate system.

In some embodiments, the positioning information may be determined by GPS. Of course, the positioning information may also be determined by a corresponding sensor.

S22: updating the preset grid map with the ultrasonic information according to the positioning information and internal and external parameters of ultrasonic sensors, to generate the target grid map.

In the embodiments of the present disclosure, a relative position relationship between the vehicle and the preset grid map may be determined according to the positioning information, and a relative position relationship between the vehicle and the ultrasonic sensors may be determined according to an external parameter of the ultrasonic sensors, so as to determine the relative position relationship between the ultrasonic sensors and the grid map. An internal parameter of the ultrasonic sensors is a ultrasonic detection model parameter, which is used to update an occupation ratio of grids within a detection area in the preset grid map, so as to obtain a target grid map.

According to another aspect of the embodiments of the present disclosure, the embodiments of the present disclosure also provide a parking space detection apparatus.

Figure 12:
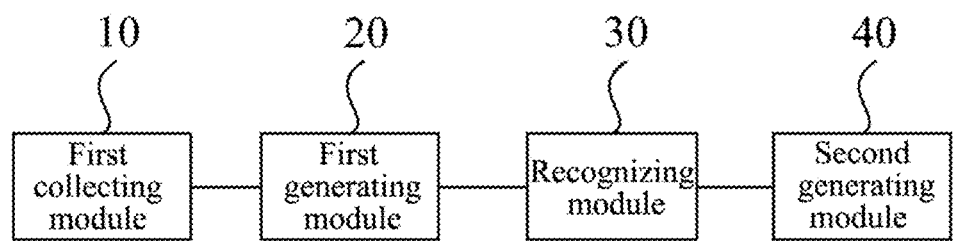
FIG. 12 is a schematic diagram of a parking space detection apparatus according to an embodiment of the present disclosure.

Please refer to FIG. 12, which is a schematic diagram of a parking space detection apparatus according to an embodiment of the disclosure.

Referring to FIG. 12, which is a schematic diagram of a parking space detection apparatus according to an embodiment of the present disclosure.

As shown in FIG. 12, the apparatus includes:

a first collecting module 10, configured to collect ultrasonic information during a moving process of a vehicle;

a first generating module 20, configured to generate a target grid map corresponding to the ultrasonic information, the target grid map including an obstacle point;

a recognition module 30, configured to perform feature recognition on the target grid map to obtain a line segment; and a second generating module 40, configured to generate a parking space according to the line segment and the target grid map to display the parking space.

In some embodiments, the second generating module 40 is configured to select a characteristic line segment corresponding to the vehicle from the line segment, where the characteristic line segment includes a forward characteristic line segment and/or a lateral characteristic line segment, and generate the parking space according to the characteristic line segment and the target grid map.

In some embodiments, the second generating module 40 is configured to select a plurality of grids corresponding to the vehicle from the target grid map based on the characteristic line segment, and determine an area corresponding to the selected plurality of grids to be the parking space.

In some embodiments, the second generating module 40 is configured to, in response to that a plurality of parking spaces include a same grid and a number of the same grid is greater than a preset first threshold, perform a merging processing to the plurality of parking spaces including the same grid.

Figure 13:
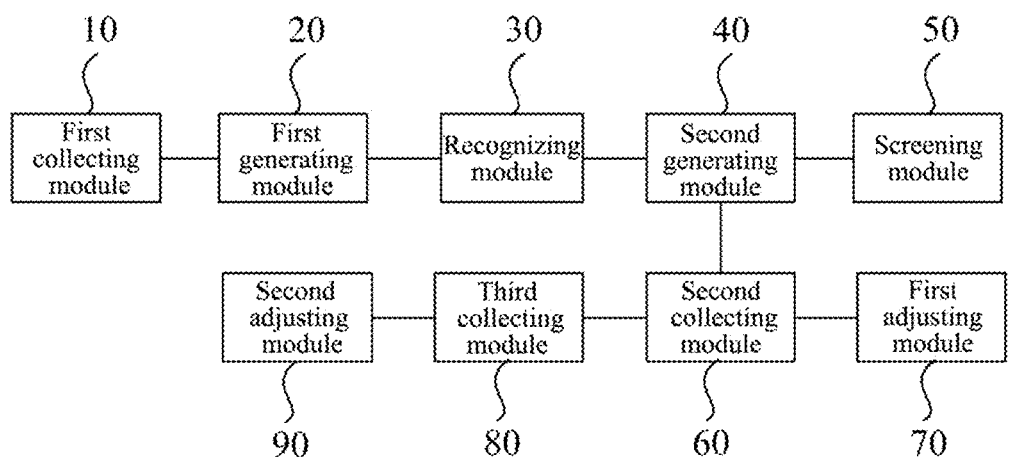
FIG. 13 is a schematic diagram of a parking space detection apparatus according to an embodiment of the present disclosure.

With reference to FIG. 13, it can see that, in some embodiments, the apparatus further includes:

a screening module 50, configured to screen the parking space in response to that at least part of grids corresponding to the parking space is occupied by the obstacle point and a number of the grids occupied by the obstacle point is larger than a preset second threshold.

With reference to FIG. 13, it can be seen that, in some embodiments, the apparatus further includes:

a second collecting module 60, configured to collect the obstacle point in the target grid map based on a width direction of the parking space; and a first adjusting module 70, configured to adjust a width of the parking space according to a collected first obstacle point set; and/or, a second collecting module 60, configured to collect the obstacle point in the target grid map based on a width direction of the parking space to obtain a first obstacle point set; a third collecting module 80, configured to collect the obstacle point in the target grid map based on a depth direction of the parking space to obtain a second obstacle point set; and a second adjusting module 90, configured to adjust an angle of the parking space according to the first obstacle point set and the second obstacle point set.

In some embodiments, the second collecting module 60 is configured to obtain, from the target grid map and based on the parking space, the obstacle point within one preset parking space width on left and right sides of the parking space in the width direction of the parking space respectively, to obtain the first obstacle point set;

the first adjusting module 70 is configured to adjust the parking space in a width direction to a width area that has no obstacle points and that is between one preset parking space width on the left side of the parking space and one preset parking space width on the right side of the parking space according to the first obstacle point set, and adjust the width of the parking space based on the width area.

In some embodiments, the second collecting module 60 is configured to obtain, from the target grid map and based on the parking space, the obstacle point within one preset parking space width on left and right sides of the parking space in the width direction of the parking space respectively, to obtain the first obstacle point set;

the third collecting module 80 is configured to obtain, from the target grid map and based on the parking space, the obstacle point within one preset parking space depth on the left and right sides of the parking space in the depth direction of the parking space respectively, to obtain the second obstacle point set; and the second adjusting module 90 is configured to fit the first obstacle point set and the second obstacle point set, respectively, to generate an adjustment angle of the parking space, and adjust the angle of the parking space according to the adjustment angle and a reference angle.

In some embodiments, the first generating module 40 is configured to collect positioning information of the vehicle relative to a preset grid map, and update the preset grid map with the ultrasonic information according to the positioning information and internal and external parameters of ultrasonic sensors, to generate the target grid map.

According to the embodiments of the present disclosure, the present disclosure also provides an electronic device and a readable storage medium.

Figure 14:
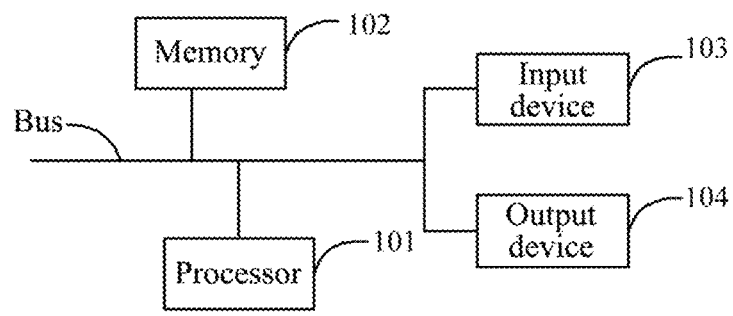
FIG. 14 is a block diagram of an electronic device according to an embodiment of the present disclosure.

FIG. 14 is a block diagram of an electronic device according to an embodiment of the present disclosure. The electronic device is intended to represent various forms of digital computers, such as a laptop, a desktop computer, a workbench, a personal digital assistant, a server, a blade server, a large-scale computer and other suitable computers. The electronic device may also represent various forms of mobile apparatus, such as a personal digital assistant, a cellular phone, a smart phone, a wearable device, and other similar computing apparatus. The components shown herein, their connections and relationships, and their functions are merely examples, and are not intended to limit the implementation of the embodiments of the present disclosure described and/or required herein.

As shown in FIG. 14, the electronic device includes: one or more processors 101, a memory 102, and interfaces for connecting various components, which includes a high-speed interface and a low-speed interface. The components are connected with each other by using different buses, and can be installed on a common motherboard or installed in other ways as required. The processor may process instructions executed in the electronic device, including instructions stored in or on the memory for displaying graphical information of a GUI on an external input/output device (such as a display device coupled to an interface). In other embodiments, if necessary, multiple processors and/or multiple buses may be used together with multiple memories. Similarly, multiple electronic devices may be connected, and each device provides a part of necessary operations (for example, as a server array, a group of blade servers, or a multi-processor system). One processor 101 is taken as an example in FIG. 14.

The memory 102 is a non-transitory computer-readable storage medium provided by an embodiment of the present disclosure, where instructions executable by at least one processor are stored in the memory, to cause the at least one processor to execute the parking space detection method provided by the embodiments of the present disclosure. The non-transitory computer-readable storage medium of the embodiments of the present disclosure stores computer instructions, and the computer instructions are used to cause a computer to execute the parking space detection method provided by the embodiments of the present disclosure.

As a non-transitory computer-readable storage medium, the memory 102 may be used to store non-transitory software programs, non-transitory computer executable programs and modules, such as the recommended corresponding program instructions/modules in the embodiments of the present disclosure. The processor 101 executes various functional applications and data processing of the server by running non-transient software programs, instructions, and modules stored in the memory 102, that is, implements the parking space detection method in the foregoing method embodiment is realized.

The memory 102 may include a program storage area and a data storage area, where the program storage area may store an operating system and an application program required by at least one function; the data storage area may store data that are created according to the use of an electronic device, etc. In addition, the memory 102 may include a high-speed random-access memory, and may also include a non-transitory memory, such as at least one of a magnetic disk storage device, a flash memory device, or other non-transitory solid-state storage devices. In some embodiments, the memory 102 may optionally include memories remotely provided with respect to the processor 101, and these remote memories may be connected to the electronic device through a network. Examples of the foregoing network include, but are not limited to, the internet, corporate intranet, local area network, Block-chain-based Service Network (Block-chain-based Service Network, BSN), mobile communication network, and combinations thereof.

The electronic device may further include: an input device 103 and an output device 104. The processor 101, the memory 102, the input device 103, and the output device 104 may be connected by a bus or in other ways. The connection by a bus in FIG. 14 is taken as an example.

The input device 103 may receive input digital or character information, and generate key signal input related to a user setting and function control of the electronic device, such as a touch screen, a keypad, a mouse, a trackpad, a touchpad, an indicator stick, one or multiple mouse buttons, a trackball, a joystick and other input devices. The output device 104 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and technologies described herein may be implemented in a digital electronic circuit system, an integrated circuit system, a dedicated ASIC (application-specific integrated circuit), computer hardware, firmware, software, and/or combinations thereof. These various embodiments may include: being implemented in one or more computer programs, the one or more computer programs may be executed and/or interpreted on a programmable system including at least one programmable processor, the programmable processor may be a dedicated or general-purpose programmable processor that can receive data and instructions from a storage system, at least one input device, and at least one output device and transmit data and instructions to the storage system, the at least one input device, and the at least one output device.

These calculation programs (also being referred to as programs, software, software applications, or codes) include machine instructions for a programmable processor, and a high-level procedure and/or an object-oriented programming language, and/or an assembly/machine language may be used to implement these computing programs. As used herein, terms "machine-readable medium" and "computer-readable medium" refer to any computer program product, device, and/or apparatus used to provide machine instructions and/or data to a programmable processor (for example, a magnetic disk, an optical disk, a memory, a programmable logic devices (PLD)), which includes a machine-readable medium that receives machine instructions as machine-readable signals. The term "machine-readable signal" refers to any signal used to provide machine instructions and/or data to a programmable processor.

In order to provide an interaction with a user, the systems and technologies described herein may be implemented on a computer, and the computer includes: a display apparatus (for example, CRT (cathode ray tube) or LCD (liquid crystal display) monitor) for displaying information to the user; and a keyboard and a pointing apparatus (for example, a mouse or a trackball), the user may provide input to the computer through the keyboard and the pointing apparatus. Other types of devices can also be used to provide the interaction with the user; for example, a feedback provided to the user may be a sensory feedback in any form (for example, visual feedback, auditory feedback, or tactile feedback); and an input from the user may be received in any form (including acoustic input, voice input or tactile input).

The systems and the technologies described herein may be implemented in a computing system that includes a back-end component (for example, as a data server), or a computing system that includes a middleware component (for example, an application server), or a computing system that includes a front-end component (for example, a user computer with a graphical user interface or a web browser, the user may interact with the implementations of the systems and the technologies described herein through the graphical user interface or the web browser), or a computing system that includes any combination of the back-end components the middleware component, or the front-end component. Components of the system may be connected with each other through digital data communications in any form or with any medium (for example, a communication network). Examples of communication network include: a local area network (LAN), a block-chain-based service network (block-chain-based service network, BSN), a wide area network (WAN), and the internet.

The computer system may include a client and a server. The client and the server are generally far away from each other and usually interact through a communication network. A relationship between the client and the server is generated by computer programs that runs on a corresponding computer and has a client-server relationship with each other.

According to another aspect of the embodiments of the present disclosure, an embodiment of the present disclosure also provides a vehicle, where the vehicle includes a parking space detection apparatus described according to any one of the foregoing embodiments; or, an electronic device described in the foregoing embodiments.

Figure 15:
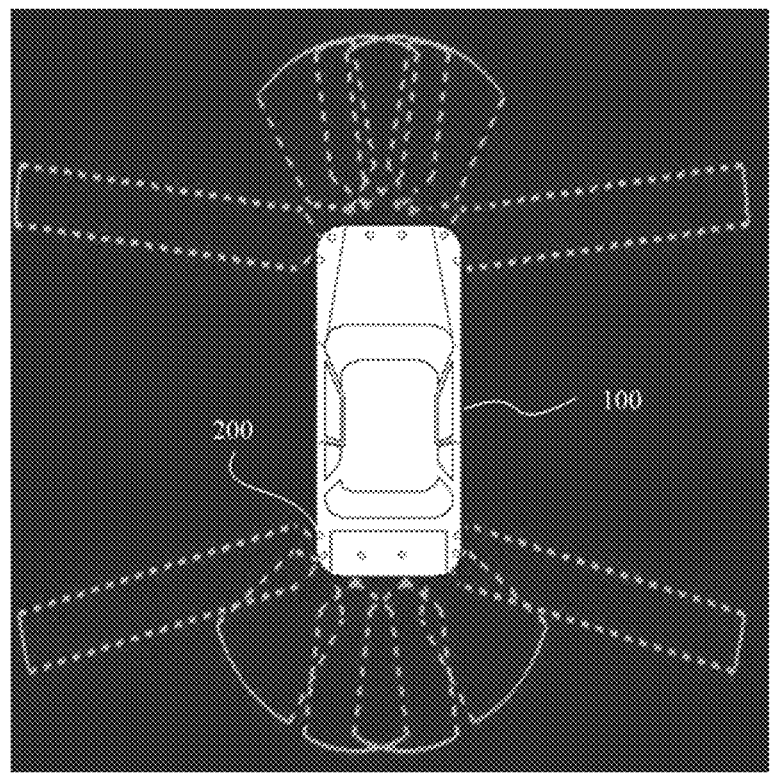
FIG. 15 is a schematic structural diagram of a vehicle according to an embodiment of the present disclosure.

In some embodiments, reference can be made to FIG. 15 for a schematic structural diagram of the vehicle.

As shown in FIG. 15, twelve ultrasonic sensors 200 are provided on the vehicle 100, among which four ultrasonic sensors 200 are arranged on the front end of the vehicle 100, four ultrasonic sensors 200 are provided at the rear end of the vehicle 100, two ultrasonic sensors 200 are provided at the left side of the vehicle 100, and two ultrasonic sensors 200 are provided at the right side of the vehicle 100. Moreover, the eight ultrasonic sensors located at the front and rear ends of the vehicle 100 are short-distance detection ultrasonic sensors, and the four ultrasonic sensors located on the left and right sides of the vehicle 100 are long-distance detection ultrasonic sensors. The dashed frames represent detection ranges of the ultrasonic sensors.

It is worth noting that the number and installation positions of the ultrasonic sensors in the abovementioned examples are only for exemplary description, and shall not be understood as limitations to the number and installation positions of ultrasonic sensors.

According to another aspect of the embodiments of the present disclosure, an embodiment of the present disclosure also provides a parking space detection method.

Figure 16:
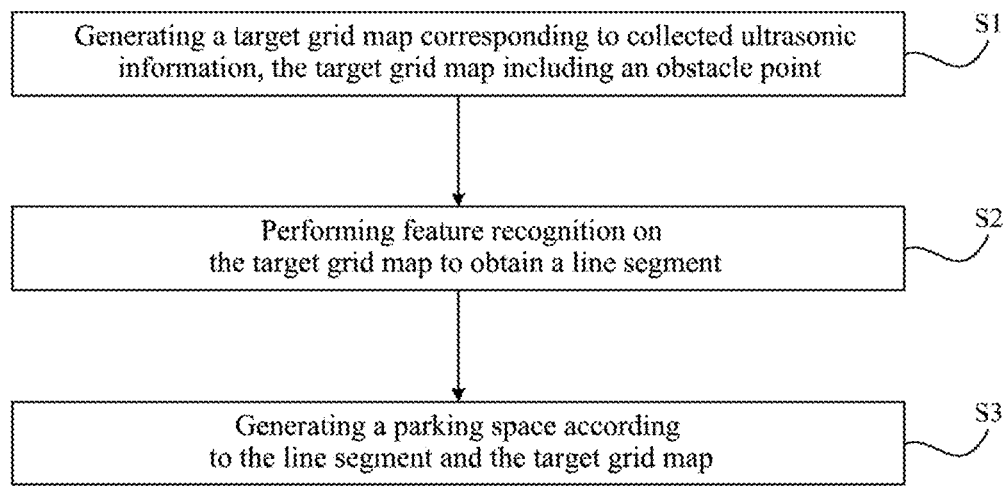
FIG. 16 is a schematic flowchart of a parking space detection method according to an embodiment of the present disclosure.

Please refer to FIG. 16, which is a schematic flowchart of a parking space detection method according to an embodiment of the present disclosure.

As shown in FIG. 16, the method includes:

S1: generating a target grid map corresponding to collected ultrasonic information, the target grip map including an obstacle point;

S2: performing feature recognition on the target grid map to obtain a line segment; and S3: generating a parking space according to the line segment and the target grid map.

It should be understood that the abovementioned flows in various forms may be used to reorder, add or delete steps. For example, the steps described in the present disclosure may be executed concurrently, sequentially, or in a different order, as long as the expected result of the technical solution disclosed in the present disclosure can be achieved, which is not limited herein.

The abovementioned specific implementations do not constitute a limitation to the protection scope of the present disclosure. Those skilled in the art should understand that various modifications, combinations, sub-combinations, and substitutions may be made according to design requirements and other factors. Any modifications, equivalent substitutions and improvements made within the spirit and principles of this disclosure should be included in the protection scope of this disclosure.

What is claimed is:

1. A parking space detection method, comprising:
   collecting ultrasonic information during a moving process of a vehicle;
   generating a target grid map corresponding to the ultrasonic information, the target grid map comprising an obstacle point;
   performing feature recognition on the target grid map to obtain a line segment; and
   generating a parking space according to the line segment and the target grid map, so as to display the parking space;
   wherein after generating the parking space, the method further comprises at least one of:
   collecting the obstacle point in the target grid map based on a width direction of the parking space to obtain a first obstacle point set, and adjusting a width of the parking space according to the collected first obstacle point set; or
   collecting the obstacle point in the target grid map based on the width direction of the parking space to obtain the first obstacle point set, and collecting the obstacle point in the target grid map based on a depth direction of the parking space to obtain a second obstacle point set, and adjusting an angle of the parking space according to the first obstacle point set and the second obstacle point set.

2. The parking space detection method according to claim 1, wherein the generating a parking space according to the line segment and the target grid map comprises:
   selecting a characteristic line segment corresponding to the vehicle from the line segment, wherein the characteristic line segment comprises a forward characteristic line segment and/or a lateral characteristic line segment; and
   generating the parking space according to the characteristic line segment and the target grid map.

3. The parking space detection method according to claim 2, wherein the generating a parking space according to the characteristic line segment and the target grid map comprises:
   selecting a plurality of grids corresponding to the vehicle from the target grid map based on the characteristic line segment; and
   determining an area corresponding to the selected plurality of grids to be the parking space.

4. The parking space detection method according to claim 3, wherein after determining the area corresponding to the selected plurality of grids to be the parking space, the method further comprises:
   in response to that a plurality of parking spaces comprise a same grid and a number of the same grid is greater than a preset first threshold, performing a merging processing on the plurality of parking spaces comprising the same grid.

5. The parking space detection method according to claim 1, wherein after generating the parking space, the method further comprises:
   screening the parking space in response to that at least part of grids corresponding to the parking space is occupied by the obstacle point and a number of grids occupied by the obstacle point is greater than a preset second threshold.

6. The parking space detection method according to claim 1, wherein the collecting the obstacle point in the target grid map based on a width direction of the parking space comprises:

obtaining, from the target grid map and based on the parking space, the obstacle point within one preset parking space width on left and right sides of the parking space in the width direction of the parking space respectively, to obtain the first obstacle point set; and the adjusting a width of the parking space according to the collected first obstacle point set comprises: adjusting the parking space in the width direction to a width area that has no obstacle points and that is between one preset parking space width on the left side of the parking space and one preset parking space width on the right side of the parking space according to the first obstacle point set, and adjusting the width of the parking space based on the width area.

7. The parking space detection method according to claim 1, wherein the collecting the obstacle point in the target grid map based on a width direction of the parking space to obtain a first obstacle point set comprises:

obtaining, from the target grid map and based on the parking space, the obstacle point within one preset parking space width on left and right sides of the parking space in the width direction of the parking space respectively, to obtain the first obstacle point set; and the collecting the obstacle point in the target grid map based on a depth direction of the parking space to obtain a second obstacle point set comprises: obtaining, from the target grid map and based on the parking space, the obstacle point within one preset parking space depth on the left and right sides of the parking space in the depth direction of the parking space respectively, to obtain the second obstacle point set; and the adjusting an angle of the parking space according to the first obstacle point set and the second obstacle point set comprises: fitting the first obstacle point set and the second obstacle point set, respectively, to generate an adjustment angle of the parking space, and adjusting the angle of the parking space according to the adjustment angle and a reference angle.

8. A parking space detection apparatus, comprising:
at least one processor; and
a memory communicatively connected with the at least one processor; wherein, the memory stores instructions executable by the at least one processor, and the instructions when executed by the at least one processor, cause the at least one processor to:
collect ultrasonic information during a moving process of a vehicle;
generate a target grid map corresponding to the ultrasonic information, the target grid map comprising an obstacle point;
perform feature recognition on the target grid map to obtain a line segment; and
generate a parking space according to the line segment and the target grid map, so as to display the parking space;
wherein the instructions further cause the at least one processor to perform at least one of:
collecting the obstacle point in the target grid map based on a width direction of the parking space to obtain a first obstacle point set; and adjusting a width of the parking space according to the collected first obstacle point set; or
collecting the obstacle point in the target grid map based on the width direction of the parking space to obtain the first obstacle point set; and collecting the obstacle point in the target grid map based on a depth direction of the parking space to obtain a second obstacle point set; and adjusting an angle of the parking space according to the first obstacle point set and the second obstacle point set.

9. The parking space detection apparatus according to claim 8, wherein the instructions further cause the at least one processor to select a characteristic line segment corresponding to the vehicle from the line segment, and generate the parking space according to the characteristic line segment and the target grid map, wherein the characteristic line segment comprises a forward characteristic line segment and/or a lateral characteristic line segment.

10. The parking space detection apparatus according to claim 9, wherein the instructions further cause the at least one processor to select a plurality of grids corresponding to the vehicle from the target grid map based on the characteristic line segment, and determine an area corresponding to the selected plurality of grids to be the parking space.

11. The parking space detection apparatus according to claim 10, wherein the instructions further cause the at least one processor to, in response to that a plurality of parking spaces comprise a same grid and a number of the same grid is greater than a preset first threshold, perform a merging processing to the plurality of parking spaces comprising the same grid.

12. The parking space detection apparatus according to claim 8, the instructions further cause the at least one processor to:
screen the parking space in response to that at least part of grids corresponding to the parking space is occupied by the obstacle point and a number of grids occupied by the obstacle point is greater than a preset second threshold.

13. The parking space detection apparatus according to claim 8, wherein the instructions cause the at least one processor to obtain, from the target grid map and based on the parking space, the obstacle point within one preset parking space width on left and right sides of the parking space in the width direction of the parking space respectively, to obtain the first obstacle point set; and adjust the parking space in the width direction to a width area that has no obstacle points and that is between one preset parking space width on the left side of the parking space and one preset parking space width on the right side of the parking space according to the first obstacle point set, and adjust the width of the parking space based on the width area.

14. The parking space detection apparatus according to claim 8, wherein the instructions cause the at least one processor to obtain, from the target grid map and based on the parking space, the obstacle point within one preset parking space width on left and right sides of the parking space in the width direction of the parking space respectively, to obtain the first obstacle point set;

obtain, from the target grid map and based on the parking space, the obstacle point within one preset parking space depth on the left and right sides of the parking space in the depth direction of the parking space respectively, to obtain the second obstacle point set; and fit the first obstacle point set and the second obstacle point set, respectively, to generate an adjustment angle of the parking space, and adjust the angle of the parking space according to the adjustment angle and a reference angle.

15. The parking space detection apparatus according to claim 8, wherein the instructions further cause the at least one processor to collect positioning information of the vehicle relative to a preset grid map, and update the preset grid map with the ultrasonic information according to the positioning information and internal and external parameters of ultrasonic sensors, to generate the target grid map.

16. A vehicle, comprising: the parking space detection apparatus according to claim 8.

17. A non-transitory computer-readable storage medium storing computer instructions, wherein the computer instructions are configured to cause the computer to execute the parking space detection method according to claim 1.

18. A parking space detection method, comprising:
generating a target grid map corresponding to collected ultrasonic information, the target grid map comprising an obstacle point;
performing feature recognition on the target grid map to obtain a line segment; and
generating a parking space according to the line segment and the target grid map;
wherein after generating the parking space, the method further comprises at least one of:
collecting the obstacle point in the target grid map based on a width direction of the parking space to obtain a first obstacle point set, and adjusting a width of the parking space according to the collected first obstacle point set; or
collecting the obstacle point in the target grid map based on the width direction of the parking space to obtain the first obstacle point set, and collecting the obstacle point in the target grid map based on a depth direction of the parking space to obtain a second obstacle point set, and adjusting an angle of the parking space according to the first obstacle point set and the second obstacle point set.

\* \* \* \* \*